(12) United States Patent
Knight, III et al.

(10) Patent No.: US 8,297,004 B2
(45) Date of Patent: Oct. 30, 2012

(54) METHOD FOR SUPPORTING A STRUCTURE

(75) Inventors: Stephen J. Knight, III, Littleton, CO (US); William E. Kugler, Denver, CO (US)

(73) Assignee: United Construction Products, Denver, CO (US)

( * ) Notice: Subject to any disclaimer, the term of this patent is extended or adjusted under 35 U.S.C. 154(b) by 0 days.

(21) Appl. No.: 13/085,099

(22) Filed: Apr. 12, 2011

(65) Prior Publication Data

US 2011/0185675 A1 Aug. 4, 2011

Related U.S. Application Data

(62) Division of application No. 12/202,319, filed on Aug. 31, 2008, now Pat. No. 7,921,612.

(51) Int. Cl.
  *E04B 9/00* (2006.01)
(52) U.S. Cl. ............. 52/126.6; 52/126.7; 52/126.4; 248/188.4; 248/188.8; 248/354.3; 403/299
(58) Field of Classification Search .............. 52/126.6, 52/126.4, 126.7, 126.1, 122.1, 745.05; 248/188.5, 248/188.4, 188.9, 351, 354.3, 161, 188.8, 248/346.01, 346.05, 346.06, 349.1; 403/299; 254/354; 108/150
  See application file for complete search history.

(56) References Cited

U.S. PATENT DOCUMENTS

| | | | |
|---|---|---|---|
| 3,398,933 A | 8/1968 | Haroldson | |
| 4,780,571 A * | 10/1988 | Huang | 174/484 |
| 5,479,745 A * | 1/1996 | Kawai et al. | 52/126.6 |
| 5,588,264 A * | 12/1996 | Buzon | 52/126.6 |
| 5,791,096 A * | 8/1998 | Chen | 52/126.6 |
| 5,881,979 A | 3/1999 | Rozier, Jr. et al. | |
| 6,363,685 B1 * | 4/2002 | Kugler | 52/745.05 |
| 6,442,906 B1 | 9/2002 | Hwang | |
| 7,866,096 B2 * | 1/2011 | Lee et al. | 52/126.6 |
| 7,921,612 B2 * | 4/2011 | Knight et al. | 52/126.6 |
| 2002/0148173 A1 | 10/2002 | Kugler | |
| 2004/0035064 A1 * | 2/2004 | Kugler et al. | 52/126.6 |
| 2004/0261329 A1 | 12/2004 | Kugler et al. | |
| 2010/0050457 A1 * | 3/2010 | Knight et al. | 33/836 |
| 2011/0011012 A1 | 1/2011 | Knight, III et al. | |
| 2011/0016809 A1 * | 1/2011 | Knight et al. | 52/263 |

FOREIGN PATENT DOCUMENTS

| | | |
|---|---|---|
| EP | 0373088 A1 | 6/1990 |
| EP | 1304426 A2 | 4/2003 |

OTHER PUBLICATIONS

Level-It Product Brochure, United Construction Products, Inc. (Apr. 2007).
Level-It Assembly Instructions, United Construction Products, Inc. (2005).

* cited by examiner

*Primary Examiner* — Amy Sterling
*Assistant Examiner* — Todd M Epps
(74) *Attorney, Agent, or Firm* — Marsch Fischmann & Breyfogle LLP

(57) ABSTRACT

A method and device for supporting a structure above a fixed surface. The device can include a support pedestal whose height is adjustable through a range of heights without a substantial gap in the obtainable heights.

8 Claims, 6 Drawing Sheets

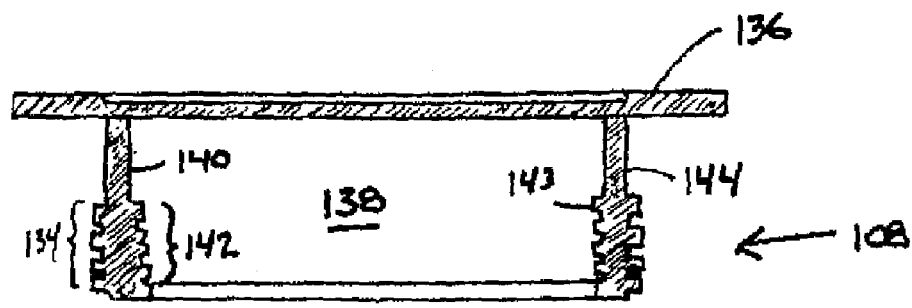
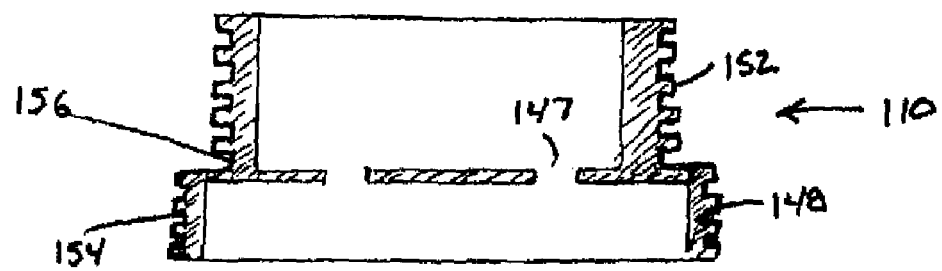
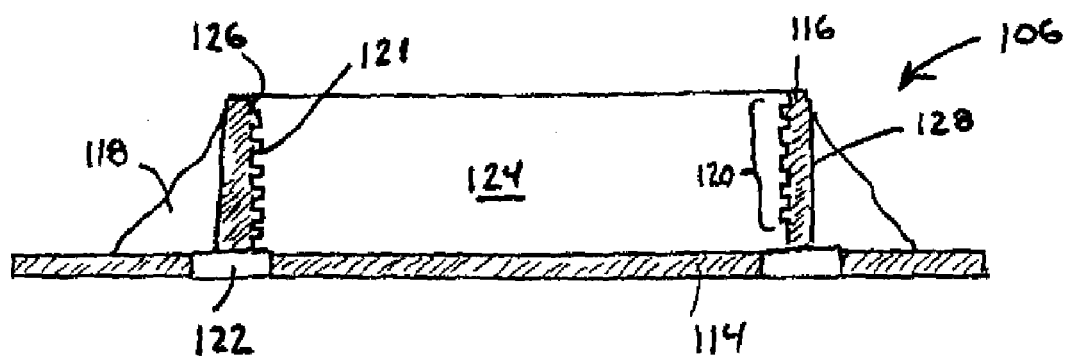
Fig. 4

METHOD FOR SUPPORTING A STRUCTURE

CROSS-REFERENCE TO RELATED APPLICATIONS

This application claims priority as a divisional application of U.S. patent application Ser. No. 12/202,319, filed Aug. 31, 2008, entitled "METHOD AND DEVICE FOR SUPPORTING A STRUCTURE", now U.S. Pat. No. 7,921,612, which is incorporated by reference herein in its entirety.

BACKGROUND OF THE INVENTION

1. Field of the Invention

This invention relates to the field of support members. In particular, the present invention relates to support pedestals that are particularly adapted for supporting a structure, such as a walking surface, above a fixed surface.

2. Description of Related Art

One method for supporting building surfaces, such as decks or terraces, is to support the members making up the building surface, such as pavers, panels or timber, with support pedestals. For example, in outdoor applications, the building surface may be elevated above a fixed surface by the pedestals to promote drainage, provide a level structural surface for walking, and/or prevent deterioration of or damage to the surface members.

One example of such a support pedestal is disclosed in U.S. Pat. No. 5,588,264 by Buzon, which incorporated herein by reference in its entirety. The pedestal disclosed by Buzon can be used in outdoor or indoor environments and is capable of supporting heavy loads applied by many types of building surfaces. The pedestal includes rotatably engageable threaded members to enable the height of the pedestal support to be adjusted. The support pedestal assembly can also include a coupler member for extending the height of the pedestal, if necessary.

One problem is that many projects using support pedestals require the use of pedestals of varying heights to accommodate variations in the fixed surface upon which the pedestals are placed, or to create architectural features in the building surface. However, most pedestals have a relatively narrow range of heights that are obtainable. This may require a builder to purchase many different sized pedestals and therefore require the builder to determine how many of each height pedestal to acquire. Extensions such as that disclosed in U.S. Pat. No. 5,588,264 can be used to increase the height of the pedestal, however such extensions leave a gap in the obtainable pedestal height, which can again require a builder to acquire many different sized pedestals.

Further, another problem that is encountered is that each threaded pedestal member must be rotatably engaged with its mating member to a depth that is sufficient to maintain the structural integrity of the pedestal. That is, when increasing the height of the pedestal by rotating to pedestal members in relation to each other, the threads cannot be disengaged to the extent that the two members are not sufficiently rigidly connected to maintain the desired pedestal strength.

SUMMARY OF THE INVENTION

Accordingly, in one embodiment, a support pedestal for supporting an object above a surface and having an adjustable height is provided. The structure of the support pedestal can advantageously permit the total height of the pedestal to be adjusted from minimum height to a maximum and all heights in between the minimum and maximum heights without any substantial gaps in the height of the support pedestal.

In one aspect, the support pedestal comprises a base member, the base member comprising a base plate that is adapted to be placed upon a surface, and comprising a cylindrical base extension extending away from the base plate. The base extension can comprise a cylindrical wall defining a base member bore and can comprise at least first base threads that are disposed on a surface of the base extension cylindrical wall. The support pedestal can also comprise a support member comprising a cylindrical support extension, the support extension comprising a cylindrical wall defining a support member bore and comprising at least a first threaded support portion comprising first support threads that are disposed on a surface of the support extension cylindrical wall. A support surface can be disposed on a distal end of the support extension.

A height adjusting member comprising first and second cylindrical threaded engagement portions is also provided, the first threaded engagement portion having a first diameter and being adapted to rotatably engage with the first base threads and the second threaded engagement portion having a second diameter that is different than the first diameter and being adapted to rotatably engage with the first support threads, whereby the height of the support pedestal can be adjusted, such as by varying the depth of engagement of the threaded portions.

In one aspect, the first cylindrical threaded engagement portion can have a diameter that is larger than the diameter of the second cylindrical threaded engagement portion. In one particular aspect, the first cylindrical threaded engagement portion has a diameter of at least about 4 inches. In another aspect, the second cylindrical engagement portion has a diameter of not greater than about 4 inches.

In a further aspect, the first base threads disposed on a surface of the base extension cylindrical wall are adapted to rotatably engage with the first support threads disposed on a surface of support extension cylindrical wall.

In a further aspect, the height adjusting member is completely disposed within the base member bore and support member bore. The height of the height adjusting member can be not greater than the combined height of the cylindrical base extension and a cylindrical support extension.

In yet another aspect, the base member further comprises a support flange extending from the base plate and along the outer surface of the cylindrical wall. In a further aspect at least one of the thread portions comprises an indexing element that is adapted to inhibit relative rotation between threaded portions when such threaded portions are being rotatably engaged. The indexing element can include a plurality of protuberances extending from the surface of a thread and a plurality of protuberances extending from an inner surface disposed between mating threads.

In another embodiment, a support pedestal for supporting object above a surface and having an adjustable height is provided. The support pedestal can include a base member comprising a base plate that is adapted to be placed upon a surface. A cylindrical base extension can extend away from the base plate, where the base extension comprises a cylindrical wall defining a base member bore and comprises a first base threads disposed on an inner surface of the cylindrical wall. A support member is provided that includes a cylindrical support extension and a support surface disposed on a distal end of the support extension. The support extension can include a cylindrical wall defining a support member bore and comprising first support threads disposed on an inner surface of the support extension cylindrical wall and second support threads disposed on an outside surface of the support extension cylindrical wall. The support pedestal also includes a height adjusting member that includes first and second cylindrical threaded engagement portions on an outer surface thereof, the first threaded engagement portion being adapted to rotatably engage with the first base threads and the second threaded engagement portion being adapted to rotatably engage with the second support member threads. The diameter of the first threaded engagement portion can be larger than the diameter of the second threaded engagement portion.

In another embodiment, a support pedestal for supporting object above a surface and having an adjustable height is provided. The support pedestal can include a base member comprising a base plate that is adapted to be placed upon a surface, and a cylindrical base extension extending away from the base plate, the base extension comprising a cylindrical wall defining a base member bore and comprising at least a first base threads disposed on a surface of the base extension cylindrical wall.

The support pedestal can also include a support member comprising a cylindrical support extension, the support extension comprising a cylindrical wall defining a support member base and comprising at least first support threads that are adapted to rotatably engage with the first base threads of the cylindrical base extension. In this manner, the first base threads and for the first support threads can include indexing elements to tactilely indicate to a user that the threaded portions are sufficiently engaged.

According to another embodiment, a method for elevating a portion of a building surface above a fixed surface is provided. The method can include the steps of providing a support pedestal comprising a base member, a support member and a height adjusting member, where the height adjusting member is adapted to rotatably interconnect the base member and the support member. The base member can be positioned on a fixed surface. The base member can then be rotated relative to the height adjusting member until resistance is tactilely felt by a user, the resistance tending to inhibit relative rotation between a base member and the height adjusting member. Thereafter, a portion of the building surface can be placed upon the support member.

In one aspect, the rotating step includes overcoming the resistance to restore relative rotation between the base member and the height adjusting member.

According to another embodiment, a method for elevating a portion of a building surface above a fixed surface is provided. The method can include the steps of providing a pedestal support comprising a base member, a support member and a height adjusting member that is adapted to rotatably engage the base member and the support member to interconnect the base member and support member. The base member can be positioned on a fixed surface and the height adjusting member can be rotated relative to the base member until the height adjusting member is secured within the base member. The support member can be rotated until the support member is in threaded engagement with the base member. Thereafter, a building surface can be placed on the support member.

DESCRIPTION OF THE DRAWINGS

FIG. 4 illustrates a front cross-sectional view of the members of a support pedestal.

DESCRIPTION OF THE INVENTION

Figure 1:
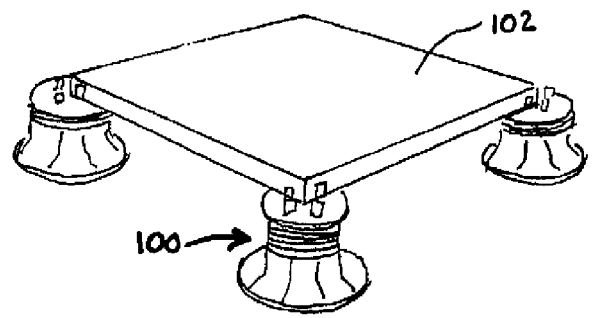
FIG. 1 illustrates a perspective view of a plurality of support pedestals supporting a concrete paver.

FIG. 1 illustrates a plurality of support pedestals supporting a concrete paver 102. As is illustrated in FIG. 1, the support pedestals 100 are placed on a fixed surface and support a plurality of pavers 102 above the fixed surface. Although illustrated as supporting a concrete paver 102, it will be appreciated that support pedestals can be utilized to support a wide variety of objects above a wide variety of fixed surfaces. For example, the support pedestals can be placed on fixed surfaces such as rooftops, on-grade (e.g., natural ground), over concrete slabs including cracked concrete slabs, and can be placed within water features. The support pedestals can be utilized to support a variety of objects including, but not limited to, wood tiles, natural stone, concrete pavers, metal or fiberglass grating, composites, or wood planking over traditional wood stringers.

Figure 2:
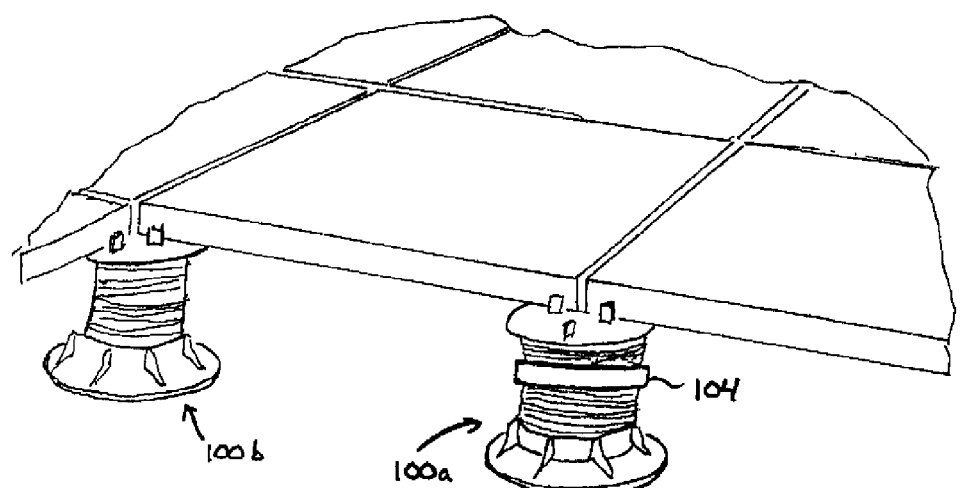
FIG. 2 illustrates a perspective view of support pedestals supporting a plurality of pavers.

The object being supported must often be supported over a fixed surface having an uneven grade or slope. To create a surface that reduces or eliminates the fluctuations in the fixed surface beneath it, the support pedestals 100 must themselves have different heights. For example, as illustrated in FIG. 2, the support pedestal 100a has a height that is greater than the height of the support pedestal 100b due to a slope in the fixed surface beneath the support pedestals. Therefore, the support pedestal 100a includes a coupling member 104 that comprises internal threads and couples top and bottom externally threaded support pedestal members, one attached to a base member that is set on the fixed surface, and another that is attached to the support member that directly supports the paver 102. An example of a support pedestal of this design is illustrated, for example, in U.S. Pat. No. 6,363,685 by Kugler. However, the use of such coupling members can leave a significant gap in the height that can be achieved using that pedestal.

Figure 3:
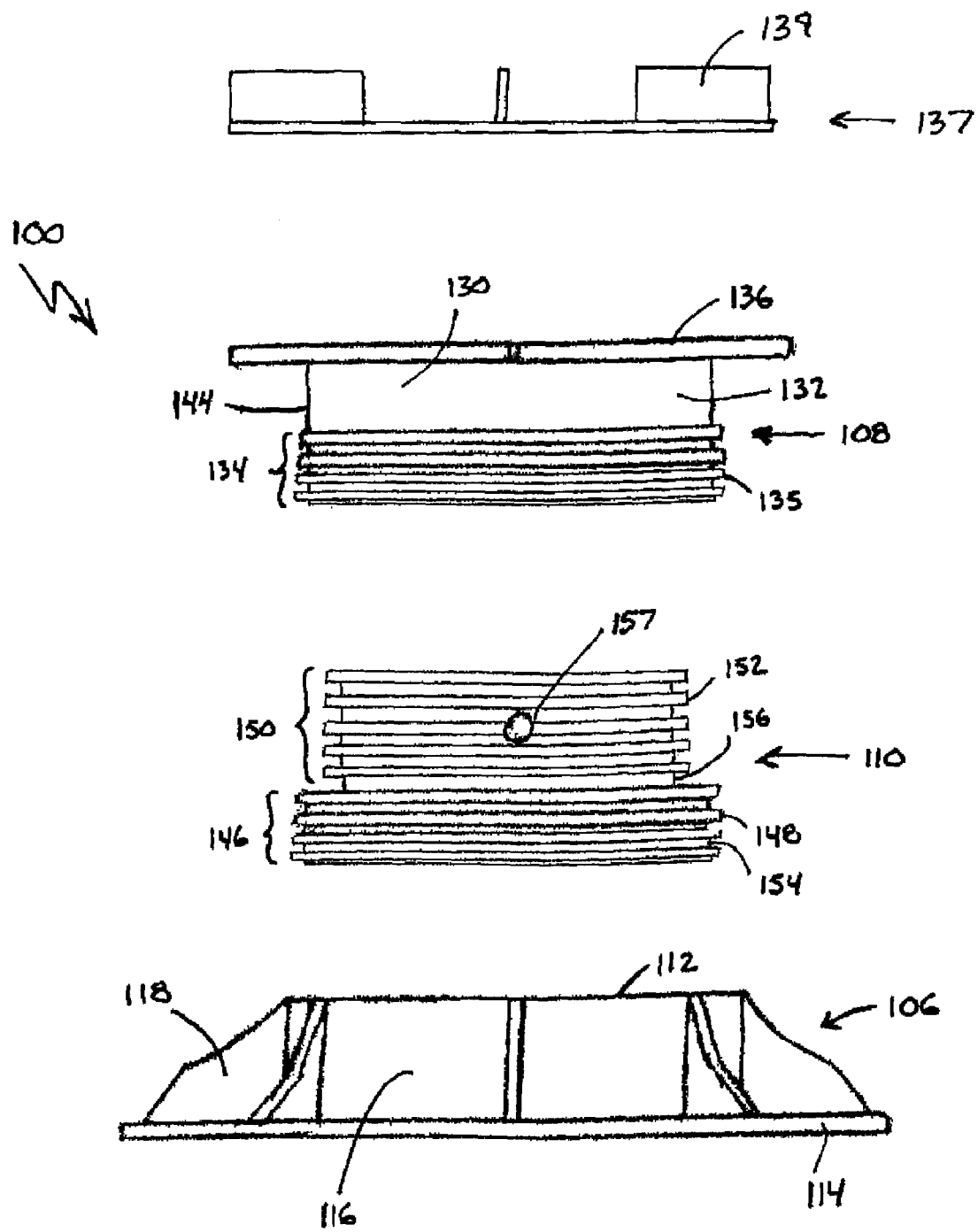
FIG. 3 illustrates a front perspective view of the members of a support pedestal.

FIG. 3 illustrates a support pedestal for supporting an object above a fixed surface. The pedestal 100 has an adjustable height to enable the formation of a level surface above a fixed surface that is not level, or to create desirable architectural features in the elevated surface. The support pedestal 100 illustrated in FIG. 3 comprises three support pedestal members, a base member 106, a support member 108, and a height adjusting member 110 that is adapted to be disposed between the base member 106 and the support member 108 to increase the height of the support pedestal 100.

The base member 106 includes a base plate 114 that is adapted to be placed upon a fixed surface. Although illustrated herein as having a circular configuration, the base plate 114 can have any reasonable configuration, such as a rectangular configuration. The base member 106 also can include a cylindrical base extension 112 that extends upwardly and transversely away from the base plate 114. The base extension 112 can include a cylindrical wall 116 having a threaded portion 120 disposed on a surface of the cylindrical wall 112.

Referring to FIG. 4, the cylindrical wall 116 can include a threaded portion 120 disposed on an interior surface 126 of the cylindrical wall 116. The threaded portion 120 includes threads 121 extending outwardly from the inner surface 126 of the cylindrical wall 116. The threads 121 are helically disposed along the threaded portion 120 of the interior surface 126. The threads 121 can be substantially continuous (e.g., a continuous single thread helically disposed on the surface), or can be discontinuous. For example, the threaded portion 120 can include a vertical portion along the interior surface 120 that is devoid of threads to facilitate the drainage of water through the base member 106. In this regard, drainage apertures 122 can also be provided to drain water out of the base member bore 124 and away from the support pedestal 100.

Reinforcing flanges 118 can also be disposed between the base plate 114 and the cylindrical wall 116 to provide additional strength and stability to the base member 106.

Referring back to FIG. 3, the pedestal 100 also includes a support member 108 that is disposed at the top of the pedestal 100. The support member 108 can include a cylindrical support extension 130 that includes a cylindrical wall 132 extending substantially transversely and downwardly from a support surface 136. The support extension 130 can include a first threaded portion 134 disposed on an outer surface 144 of the cylindrical wall 132. The threaded portion 134 includes external support threads 135 that extend outwardly from the outer surface 144 of the cylindrical wall 132 and that are helically disposed along the threaded portion 134.

The support surface 136 can be of any general shape that is desired such as circular or rectangular, and an object can be placed directly on the support surface. Further, the pedestal 100 can include a crown member 137 that is disposed on the top surface 136 of the support member 108. In one embodiment, the crown member 137 is freely rotatable on the top surface 136 so that spacers 139 can be configured as desired for supporting structural components such as pavers or the like in spaced-apart relation.

Referring to FIG. 4, the support extension 130 can also include an internal threaded portion 142 comprising threads 143 that are helically disposed along the length of the threaded portion 142. The threads 143 can be substantially continuous, or can be discontinuous, such as where a vertical portion along the interior surface 140 is substantially devoid of threads to facilitate the drainage of water through the support member 108. In this regard, the support member can comprise a bore 138 to provide downward fluid communication through the interior of the pedestal 100.

The support pedestal 100 can also include a height adjusting member 110 that is adapted to be disposed between the base member 106 and the support member 108. The height adjusting member 110 can advantageously enable the height of the support pedestal 100 to be adjusted over a broad height range with substantially no gaps in the achievable height within the height range.

The height adjusting member 110 can include a first threaded engagement portion 146 and a second threaded engagement portion 150. The first threaded engagement portion 146 can comprise external threads 148 that can be particularly adapted to be rotatably engageable with the first base internal threaded portion 120 (FIG. 4). The second threaded engagement portion 150 of the height adjusting member 110 can comprise external threads 152 that are particularly adapted to be rotatably engageable with the internal threaded portion 142 of the support member 108 (FIG. 4). Preferably, the first threaded portion 146 has an outer diameter that is greater than the outer diameter of the second threaded portion 150 of the height adjusting member 110. In one exemplary embodiment, the first threaded portion 146 has an outer diameter of about 4½ inches and the second threaded portion 150 has an outer diameter of about 3½ inches. The height adjusting member 110 can also be provided with a bore 157 to enable a tool to be inserted into the height adjusting member to apply increased torque to the member 110, such as to adjust the height of the pedestal 100 after a load is applied to the top of the pedestal.

Thus, the first threaded portion 146 is rotatably engageable with the inner threaded portion 120 of the base member and the second threaded portion 150 is rotatably engageable with the inner threaded portion 142 of the support member 108. In this manner, the base member 106 and the support member 108 can be rigidly attached via the height adjusting member 110 to form the support pedestal 100.

Figure 5:
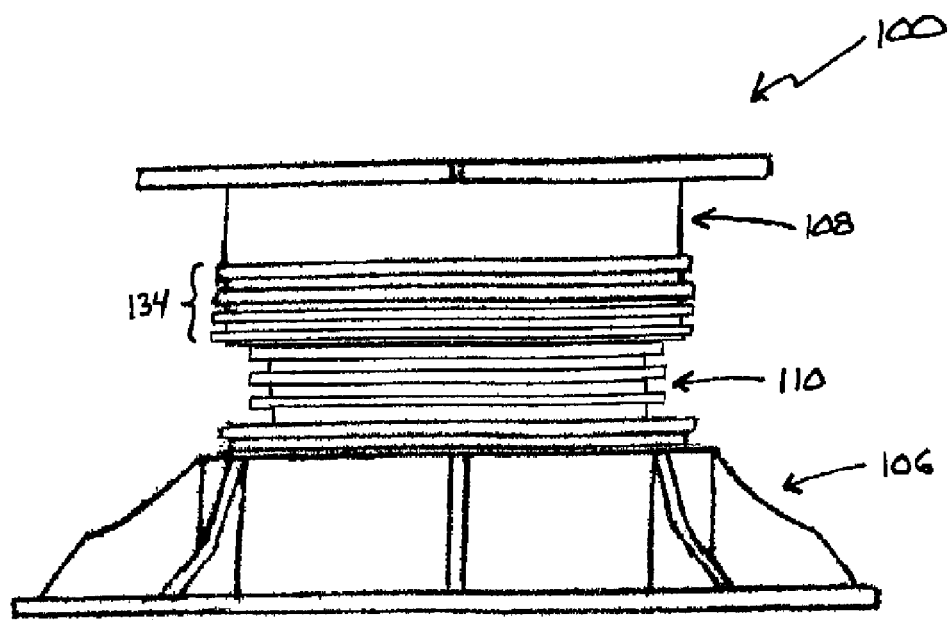
FIG. 5 illustrates a front perspective view of an assembled support pedestal.

FIG. 5 illustrates a support pedestal 100 where the height adjusting member 110 is engaged with both the base member 106 and the support member 108. By rotating the height adjusting member 110 relative to the base member 106, the height adjusting member 110 can move in a vertical (i.e., up and down) direction relative to the base member 106 to adjust the height of the support pedestal 100. Further, by rotating the height adjusting member 110 relative to the support member 108, the total height of the support pedestal 100 can also be adjusted. It is a particular advantage that the height of the support pedestal 100 can be adjusted through a wide range of heights with a single height adjusting member 110, without any substantial gaps in the achievable pedestal height.

Figure 6:
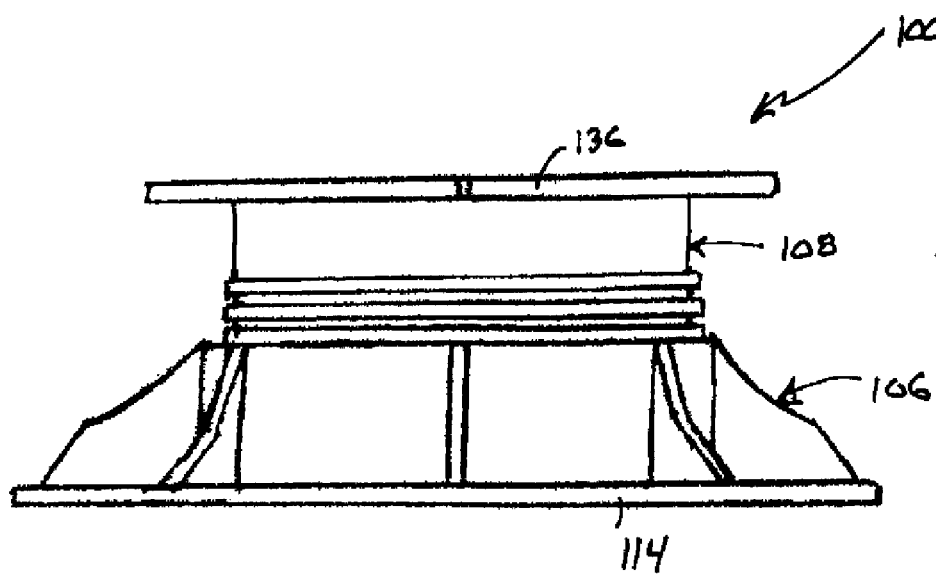
FIG. 6 illustrates a front perspective view of an assembled support pedestal.

In one aspect, the support member 108 is adapted to be rotatably engageable with the base member 106. In this manner, the height adjusting member 110 can be fully disposed within the base member bore 124 and the support member bore 138 (FIG. 4) when the support member 108 is rotatably engaged with the base member 106. As is illustrated in FIG. 6, the support member 108 is rotatably engaged with the base member 106. Thus, the outer threaded portion 134 of the support member 108 can advantageously have substantially the same outer diameter and thread pitch as the first outer threaded portion 146 of the height adjusting member 110. Further, the height of the height adjusting member 110 is preferably not greater than the combined height of the cylindrical base extension 112 and the cylindrical base extension 130.

Further, when a very low support pedestal height is desired, the height adjusting member 110 can be completely eliminated from the structure. In this manner, the support member 108 can be fully rotated into the base member 106 without being inhibited by the height adjusting member 110. From this minimum height, the support member 108 can be rotated to move upwardly from the base member 106 to increase the height of the pedestal 100. Inserting the height adjusting member 110 into the structure then enables taller support pedestals to be formed, up to the limit that the height adjusting member is at the minimum engagement depth in the support member 108 and the base member 106 without significantly compromising the strength of the support pedestal. In one exemplary embodiment, the pedestal can be adjusted from a total height of about 2 inches to a total height of about 4¾ inches in height, with no substantial gap in the height that can be achieved.

It is a particular advantage that since the height adjusting member 110 includes two threaded portions 146 and 150 with different outer diameters—one diameter that is adapted to engage the inner threaded portion 120 of the base member 106 and the other that is adapted to engage the inner threaded portion 142 of the support member 108, the height of the support pedestal 100 can be adjusted from the minimum height (e.g., by removing the height adjusting member) to the maximum height (e.g., full extension by the height adjusting member), without a gap in the height that can be achieved.

The support pedestal members can be fabricated from a wide variety of materials. Preferably, the material will be able to withstand prolonged exposure to moisture and/or ultraviolet radiation so that the support pedestal can be utilized in outdoor applications. In one particular aspect, the support pedestal members are fabricated from a high density, durable and impact resistant polymer, such as polypropylene. However, the support pedestal elements can be fabricated from other materials, including composite materials. Further, it is not necessary that each element of the support that still be fabricated from the same material.

According to another aspect, the threaded portions of one or more members of the support pedestal comprise indexing elements. Indexing elements are adapted to provide tactile feedback to a user who is rotating a pedestal member in relation to another pedestal member to rotatably engage the pedestal members. In use, the support pedestals may be adapted to support heavy loads, such as concrete pavers and must be able to also support objects and people who are on the concrete pavers. Therefore, it is important that the support pedestal maintains its strength and integrity during use. In this regard, if the pedestal support members are not rotatably engaged to a sufficient engagement depth, there is a possibility that the pedestal will fail under heavy loads. Therefore, it is important that the user is given some indication as to when a pedestal member is sufficiently engaged with an adjacent pedestal member to provide sufficient strength to the pedestal.

In this regard, for example, U.S. Pat. No. 5,588,264 by Buzon discloses an indicator slot that is located in a bottom portion of a pedestal member whereby a user can visibly identify if the pedestal member is not sufficiently engaged with its corresponding pedestal element. However, such an indicator slot requires the user to visually confirm if the support member is sufficiently rotatably engaged, which can be cumbersome for the user under many circumstances.

Figure 7:
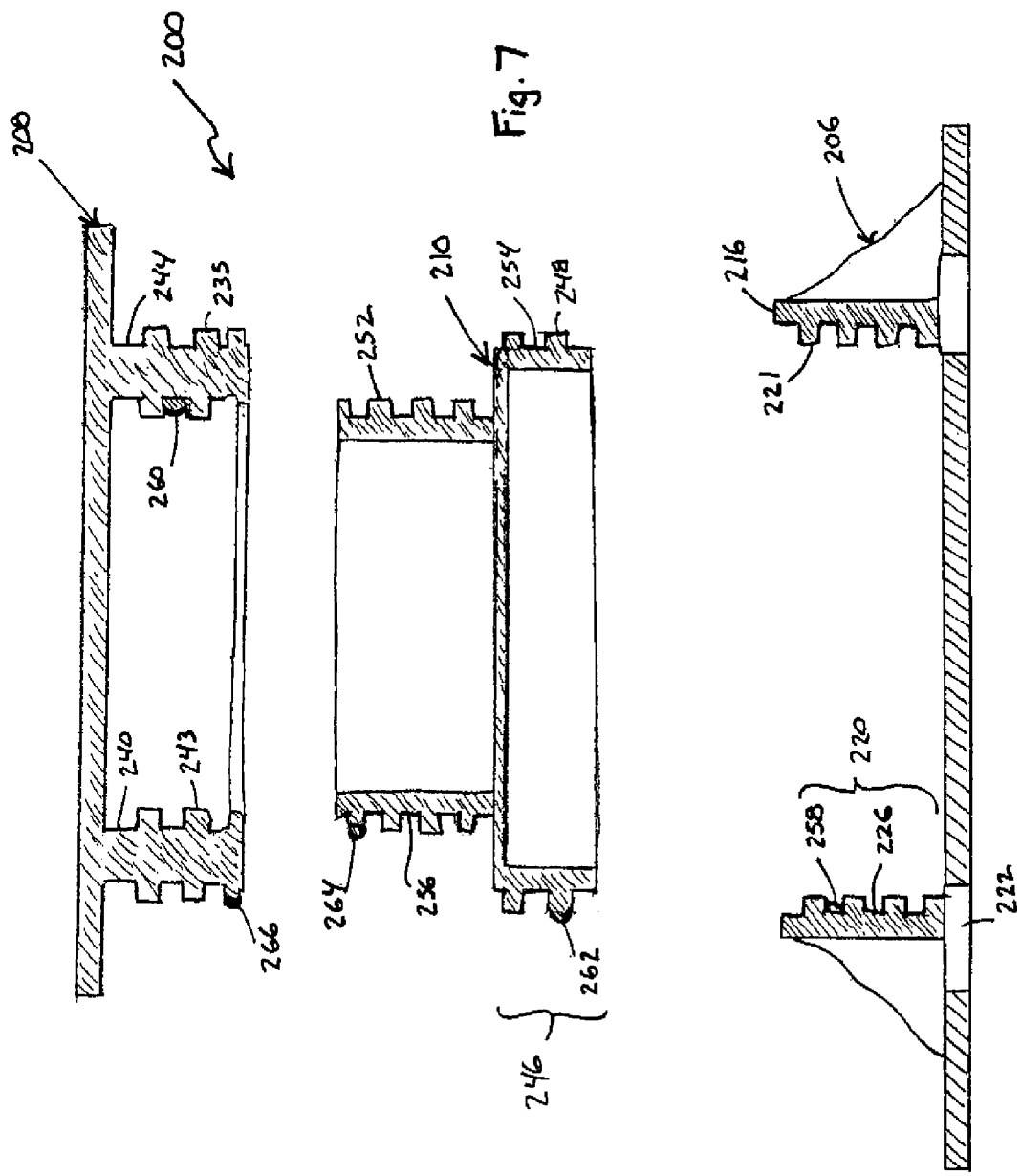
FIG. 7 illustrates a cross-sectional view of the members of a support pedestal.

FIG. 7 illustrates a support pedestal 200 that includes indexing elements that can enable a user to tactilely determine if a support member is sufficiently rotatably engaged with another support element. That is, the user will be able to feel if the support element is sufficiently engaged within the corresponding support element. In addition, the indexing elements may also provide audible confirmation that the pedestal element is sufficiently engaged with its corresponding pedestal element.

As with the embodiment illustrated in FIGS. 3-6, the support pedestal 200 illustrated in FIG. 7 includes a base member 206, a support member 208 and a height adjusting member 210. The base member 206 includes a threaded portion 220 on the interior surface 226 of the base extension cylindrical wall 216. A plurality of threads 221 project inwardly from the inner surface 226 of the cylindrical wall 216. Disposed in the gap between the inwardly projecting base threads 221 is an indexing element 258. In this embodiment, the indexing element 258 comprises a protuberance that extends outwardly from the inner surface 226 of the cylindrical wall. Preferably, the indexing element 258 comprises two or more protuberances that are adapted to come into frictional contact with protuberances extend outwardly from corresponding threads with which the threaded portion 220 is engaged. The surface indexing elements 258 can be a substantially symmetrical protuberance, for example. The protuberances preferably extend from the surface 226 at a distance that is less than the distance that the threads 221 extend. That is, the protuberances preferably sit completely within the gap formed between threads 221.

The threaded portion 246 of the height adjusting member is adapted to rotatably engage with the threaded portion 220 of the base member 206. The height adjusting member includes a corresponding thread indexing element 262 that comprises a protuberance extending outwardly from an outer surface of the thread 248. Thus, when a user begins to rotate the height adjusting member 210 relative to the base member 206, the threaded portions will at first easily engage and the members will easily rotate to engage. However, even though the threaded portions have begun to engage, this may not be a safe degree of engagement for maintaining structural integrity of the pedestal 200 under heavy loads.

As the user continues to rotate the height adjusting member 210 relative to the base member 206, the surface indexing element 258 and the thread indexing element 262 will come into frictional contact. When these two indexing elements come into frictional contact, the user will feel resistance to further rotation of the pedestal support elements, thereby giving the user tactile feedback regarding the depth of the engagement between the pedestal members.

At this point, the user can apply a moderate amount of additional torque such that the indexing elements 258 and 262 can pass by each other. When the indexing elements pass by each other, the indexing elements can also advantageously make a clicking noise to audibly indicate to the user that the threaded portions 220 and 246 have passed the point where they are sufficiently engaged. The user can then continue to rotate the height adjusting member 210 to the desired depth within the base member 206.

Similarly, if the user begins to rotate the height adjusting member 210 relative to the base member 206 in the opposite direction, the user will again reach the point where the indexing elements 258 and 262 frictionally contact and that will indicate to the user that the support pedestal members can no longer be separated by continuing rotation without jeopardizing the structural safety of the pedestal 200.

Figure 8:
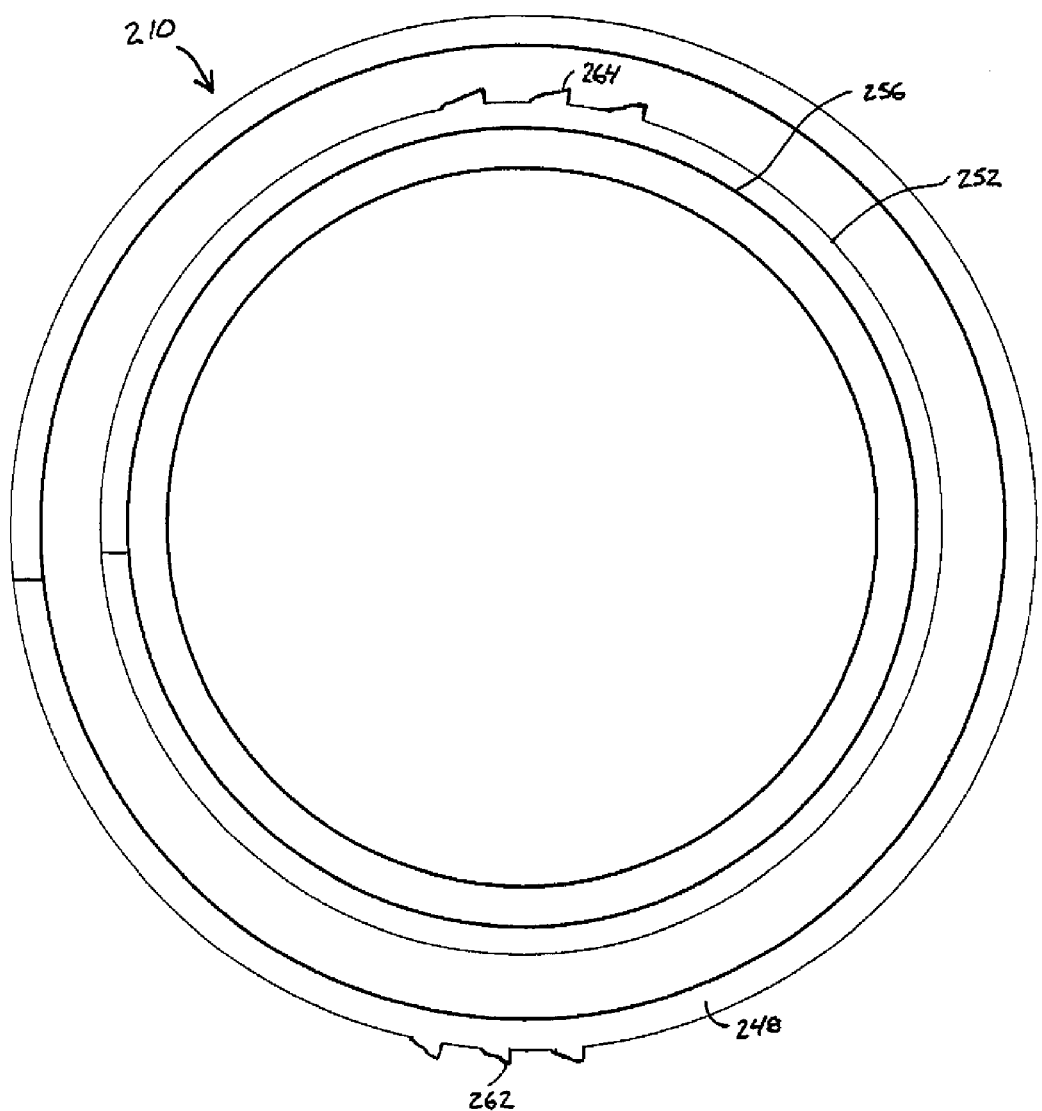
FIG. 8 illustrates a top view of a height adjusting member for a support pedestal.

Referring to FIG. 8, a top view of the height adjusting member 210 is illustrated. As is illustrated in FIG. 8, the thread indexing element 262 comprises a plurality of protuberances extending outwardly from the threads 248. The protuberances illustrated in FIG. 8 have an angled shape such that rotation in one direction is resisted to a greater degree than a rotation in the opposite direction.

The height adjusting member 210 also includes thread indexing elements 264 that are disposed on the threads 252 that extend from the cylindrical wall 256. As can be seen from FIG. 7, these thread indexing elements are adapted to cooperate with surface indexing element 260 in the support member 208 (FIG. 7), in a manner similar to that described above.

In addition, the indexing elements can advantageously facilitate the height adjustment of the support pedestal 200 by lightly engaging to support pedestal members and causing the two members to rotate in relation to one another. For example, when the adjusting the height of a support pedestal 200 that is provided form the manufacturer in the configuration illustrated in FIG. 6 (i.e., the height adjusting member being fully disposed within the base member and the support member), the user may begin by rotating the support member 208. The support member 208 can freely rotate completely out of the base member 106 and then begin to freely rotate about the threaded portion 234 of the height adjusting member, until reaching the point where the indexing elements 260 and 264 come into frictional contact. As a result of this frictional contact, the user will be tactiley informed that the upper limit has been reached, and the frictional engagement can then cause the height adjusting member 210 to begin to rotate in relation to the base member 206.

Although the indexing elements are illustrated as being utilized in conjunction with a height adjusting member, it will be appreciated that such indexing elements can be utilized in conjunction with virtually any type of support pedestal that utilizes threads to rotatably engage one pedestal member with another pedestal member. For example, the support member 208 can be rotatably engaged with the base member 206 without inclusion of the height adjusting member 210, whereby the thread indexing element 266 can frictionally engage the surface indexing element 258 to provide tactile feedback to the user that a minimum engagement depth has been reached.

While various embodiments of the present invention have been described in detail, it is apparent that modifications and adaptations of those embodiments will occur to those skilled in the art. For example, although the illustrated embodiments comprise a base member having internal threads, a height adjusting member having external threads and a support member having internal and external threads, it will be apparent that the threads can be inter-related in different ways. For example, the base member could comprise both inner and outer threads, and the support member could comprise only inner threads. Further, the height adjusting member could comprise inner threads, with the position of the threads on the base member and support member being altered accordingly. Further, although the pedestal members are describes as separate members, it will be readily appreciated that the members can be distinct or can be integrally attached to one another.

It is to be expressly understood that these and other such modifications and adaptations are within the spirit and scope of the present invention.

What is claimed is:

1. A method of elevating a portion of a building surface above a fixed surface, the method comprising the steps of:
   providing a support pedestal comprising a base member having base threads, a support member having internal support threads and external support threads, and a height-adjusting member having a first threaded cylindrical engagement portion that is adapted to rotatably engage with the base threads and having a second threaded cylindrical engagement portion that is adapted to rotatably engage with the internal support threads to operatively interconnect the base member and the support member;
   positioning the base member on the fixed surface;
   rotating the height-adjusting member relative to the base member or the base member relative to the height-adjusting member to rotatably engage the first threaded cylindrical engagement portion with the base threads until the height-adjusting member is in threaded engagement with the base member;
   rotating the height-adjusting member relative to the support member or the support member relative to the height-adjusting member to rotatably engage the second threaded cylindrical engagement portion with the internal support threads until the support member is in threaded engagement with the height-adjusting member;
   rotating the base member relative to the support member or the support member relative to the base member until the external support threads are rotatably engaged with the base threads; and
   placing the portion of the building surface on the support member.

2. The method as recited in claim 1, wherein the placing step comprises placing a tile on a support surface of the support member where the tile is selected from the group consisting of a wood tile, a natural stone tile, a concrete paver, metal grating, fiberglass grating, or a composite tile.

3. The method as recited in claim 1, wherein the fixed surface is selected from the group consisting of a rooftop, natural ground or a concrete slab.

4. The method as recited in claim 1, wherein:
   the base member comprises a base plate that is placed on the fixed surface and a base member extension that extends away from the base plate, the base member extension comprising a cylindrical wall defining a base member bore wherein the base threads are disposed on a surface of the base member extension cylindrical wall; and
   the support member comprises a support member extension, the support member extension comprising a cylindrical wall defining a support member bore wherein the internal and external support threads are disposed on opposite sides of the support member extension cylindrical wall.

5. The method as recited in claim 4, wherein the height-adjusting member is configured to be fully disposed within the base member bore and the support member bore.

6. The method as recited in claim 4, wherein the
   first threaded engagement portion comprises external threads and having a first diameter and being rotatably engaged with the base threads, and the second threaded engagement portion comprises external threads having a second diameter that is different than the first diameter and being rotatably engaged with the internal support threads.

7. The method as recited in claim 6, wherein the support pedestal is configured to be adjusted in height from a first height where the base threads disposed on a surface of the base member extension cylindrical wall are rotatably engaged with the external support threads disposed on a surface of the support extension cylindrical wall, to a second height where the first threaded engagement portion of the height-adjusting member is rotatably engaged with the base threads and the second threaded engagement portion of the height-adjusting member is rotatably engaged with the internal support threads without any gaps in the achievable pedestal height between the first height and the second height.

8. The method as recited in claim 7, wherein the diameter of the first threaded engagement portion of the height-adjusting member is greater than the diameter of the second threaded engagement portion of the height-adjusting member.

* * * * *